US012764756B2

(12) United States Patent
Li

(10) Patent No.: US 12,764,756 B2
(45) Date of Patent: Oct. 13, 2026

(54) PDCCH MONITORING PROCESSING METHOD AND MONITORING CONFIGURATION METHOD, AND RELATED DEVICE

(71) Applicant: VIVO MOBILE COMMUNICATION CO., LTD., Dongguan (CN)

(72) Inventor: Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 328 days.

(21) Appl. No.: 18/374,787

(22) Filed: Sep. 29, 2023

(65) Prior Publication Data

US 2024/0040588 A1 Feb. 1, 2024

Related U.S. Application Data

(63) Continuation of application No. PCT/CN2022/083021, filed on Mar. 25, 2022.

(30) Foreign Application Priority Data

Mar. 31, 2021 (CN) ......................... 202110347682.3

(51) Int. Cl.
*H04W 72/232* (2023.01)

(52) U.S. Cl.
CPC ................................ *H04W 72/232* (2023.01)

(58) Field of Classification Search
CPC ............ H04W 72/232; H04W 72/0446; H04L 1/0038; H04L 27/26025
See application file for complete search history.

(56) References Cited

U.S. PATENT DOCUMENTS

| | | | | |
|---|---|---|---|---|
| 2020/0351644 A1 | 11/2020 | Yang et al. | | |
| 2020/0351681 A1* | 11/2020 | Salah | .................... | H04W 76/27 |
| 2021/0160002 A1* | 5/2021 | Salah | .................... | H04L 1/0039 |

FOREIGN PATENT DOCUMENTS

| | | | |
|---|---|---|---|
| CN | 111277381 | A | 6/2020 |
| CN | 111901873 | A | 11/2020 |
| CN | 112311498 | A | 2/2021 |
| CN | 112438059 | A | 3/2021 |
| CN | 112825581 | A | 5/2021 |

(Continued)

OTHER PUBLICATIONS

Oppo, "PDCCH enhancement for URLCC", 3GPP TSG RAN WG1 #98bis, Chongqing, China, Oct. 14-20, 2019, R1-1910619.

(Continued)

*Primary Examiner* — Elton Williams
(74) *Attorney, Agent, or Firm* — The Webb Law Firm

(57) ABSTRACT

A PDCCH monitoring processing method includes receiving, by a terminal, configuration information; and determining, by the terminal, whether a target time domain location meets a PDCCH detection capability. The configuration information is used to configure the target time domain location of PDCCH monitoring. The target time domain location includes at least one first time unit. The PDCCH detection capability includes a blind detection budget restriction or a CCE budget restriction defined based on at least two second time units, a second time unit includes N first time units, and N is an integer greater than 1.

14 Claims, 3 Drawing Sheets

(56) References Cited

FOREIGN PATENT DOCUMENTS

WO 2020227142 A1 11/2020

OTHER PUBLICATIONS

Mediatek Inc, "TEI for UE capability on PDCCH monitoring occasions for Case 2 with a span gap", 3GPP TSG RAN WG1 #98bis, R1-1911077, Chongqing, China, Oct. 14-20, 2019, 2 pages.
Nokia et al., "Clarification on Frequency Separation Class", 3GPP TSG-RAN WG2 Meeting #105, R2-1902801, Athens, Greece, Feb. 25-Mar. 1, 2019, 11 pages.
Vivo, "Discussions on PDCCH monitoring enhancements for NR operation", 3GPP TSG RAN WG1 #104-e, e-Meeting, Jan. 25-Feb. 5, 2021, R1-2100430.
Samsung, "PDCCH monitoring enhancements for NR from 52.6 GHz to 71 GHz", 3GPP TSG RAN WG1 #104, e-Meeting, Jan. 25-Feb. 5, 2020, R1-2101195.

* cited by examiner

PDCCH MONITORING PROCESSING METHOD AND MONITORING CONFIGURATION METHOD, AND RELATED DEVICE

CROSS-REFERENCE TO RELATED APPLICATIONS

This application is a Bypass Continuation Application of International Patent Application No. PCT/CN2022/083021, filed Mar. 25, 2022, and claims priority to Chinese Patent Application No. 202110347682.3, filed Mar. 31, 2021, the disclosures of which are hereby incorporated by reference in their entireties.

BACKGROUND OF THE INVENTION

Field of the Invention

This application pertains to the field of communication technologies, and in particular, relates to a PDCCH monitoring processing method and monitoring configuration method, and a related device.

Description of Related Art

In a communication system, a monitoring capability of a physical downlink control channel (PDCCH) is generally defined based on a slot or a plurality of symbols.

SUMMARY OF THE INVENTION

According to a first aspect, a physical downlink control channel PDCCH monitoring processing method is provided, including:

receiving, by a terminal, configuration information, where the configuration information is used to configure a target time domain location of PDCCH monitoring; and determining, by the terminal, whether the target time domain location meets a PDCCH detection capability, where the target time domain location includes at least one first time unit, the PDCCH detection capability includes a blind detection budget restriction or a control channel element CCE budget restriction defined based on at least two second time units, the second time unit includes N first time units, and N is an integer greater than 1.

According to a second aspect, a physical downlink control channel PDCCH monitoring configuration method is provided, including:

obtaining, by a network side device, a PDCCH detection capability;

determining, by the network side device, configuration information according to the PDCCH detection capability, where the configuration information is used to configure a target time domain location of PDCCH monitoring; and sending, by the network side device, the configuration information to a terminal, where the target time domain location includes at least one first time unit, the target time domain location meets the PDCCH detection capability, the PDCCH detection capability includes a blind detection budget restriction or a control channel element CCE budget restriction defined based on at least two second time units, the second time unit includes N first time units, and N is an integer greater than 1.

According to a third aspect, a physical downlink control channel PDCCH monitoring processing apparatus is provided, including:

a receiving module, configured to receive configuration information, where the configuration information is used to configure a target time domain location of PDCCH monitoring; and a first determining module, configured to determine whether the target time domain location meets a PDCCH detection capability, where the target time domain location includes at least one first time unit, the PDCCH detection capability includes a blind detection budget restriction or a control channel element CCE budget restriction defined based on at least two second time units, the second time unit includes N first time units, and N is an integer greater than 1.

According to a fourth aspect, a physical downlink control channel PDCCH monitoring configuration apparatus is provided, including:

an obtaining module, configured to obtain a PDCCH detection capability;

a third determining module, configured to determine configuration information according to the PDCCH detection capability, where the configuration information is used to configure a target time domain location of PDCCH monitoring; and a first sending module, configured to send the configuration information to a terminal, where the target time domain location includes at least one first time unit, the target time domain location meets the PDCCH detection capability, the PDCCH detection capability includes a blind detection budget restriction or a control channel element CCE budget restriction defined based on at least two second time units, the second time unit includes N first time units, and N is an integer greater than 1.

According to a fifth aspect, a terminal is provided. The terminal includes a processor, a memory, and a program or an instruction stored in the memory and executable on the processor, where when the program or the instruction is executed by the processor, the steps of the method in the first aspect are implemented.

According to a sixth aspect, a terminal is provided, including a processor and a communication interface, where the communication interface is configured to receive configuration information, where the configuration information is used to configure a target time domain location of PDCCH monitoring; and the processor is configured to determine whether the target time domain location meets a PDCCH detection capability, where the target time domain location includes at least one first time unit, the PDCCH detection capability includes a blind detection budget restriction or a control channel element CCE budget restriction defined based on at least two second time units, the second time unit includes N first time units, and N is an integer greater than 1.

According to a seventh aspect, a network side device is provided. The network side device includes a processor, a memory, and a program or an instruction stored in the memory and executable on the processor, where when the program or the instruction is executed by the processor, the steps of the method in the second aspect are implemented.

According to an eighth aspect, a network side device is provided, including a processor and a communication interface, where the processor is configured to: obtain a PDCCH detection capability; and determine configuration information according to the PDCCH detection capability, where the configuration information is used to configure a target time domain location of PDCCH monitoring; and the communication interface is configured to send the configuration information to a terminal, where the target time domain location includes at least one first time unit, the target time domain location meets the PDCCH detection capability, the PDCCH detection capability includes a blind detection budget restriction or a control channel element CCE budget restriction defined based on at least two second time units, the second time unit includes N first time units, and N is an integer greater than 1.

According to a ninth aspect, a non-transitory computer-readable storage medium is provided. The non-transitory computer-readable storage medium stores a program or an instruction, and when the program or the instruction is executed by a processor, the steps of the method in the first aspect or the steps of the method in the second aspect are implemented.

According to a tenth aspect, an embodiment of this application provides a chip, where the chip includes a processor and a communication interface, the communication interface is coupled to the processor, and the processor is configured to execute a program or an instruction to implement the steps of the method in the first aspect or the steps of the method in the second aspect.

According to an eleventh aspect, a computer program/program product is provided, where the computer program/program product is stored in a non-transient storage medium, and the computer program/program product is executed by at least one processor to implement the method in the first aspect or the method in the second aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms “first”, “second”, and the like are intended to distinguish between similar objects but do not describe a specific order or sequence. It should be understood that, the terms used in such a way is interchangeable in proper circumstances, so that the embodiments of this application can be implemented in an order other than the order illustrated or described herein. Objects classified by “first” and “second” are usually of a same type, and the number of objects is not limited. For example, there may be one or more first objects. In addition, in the specification and the claims, “and/or” represents at least one of connected objects, and a character “/” generally represents an “or” relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms “system” and “network” in the embodiments of this application may be used interchangeably. The technologies described can be applied to both the systems and the radio technologies mentioned above as well as to other systems and radio technologies. The following descriptions describe a new radio (NR) system for example purposes, and NR terms are used in most of the following descriptions, but these technologies can also be applied to an application other than an NR system application, for example, a 6-th generation (6G) communications system.

Figure 1:
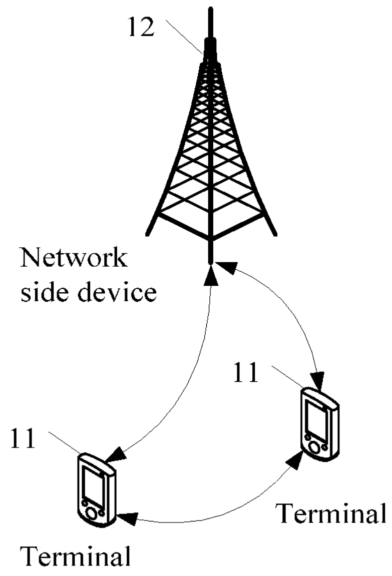
FIG. 1 is a structural diagram of a network system to which the embodiments of this application can be applied.

FIG. 1 is a block diagram of a wireless communication system to which embodiments of this application can be applied. The wireless communications system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a smartwatch, a bracelet, a headset, glasses, and the like. It should be noted that a type of the terminal 11 is not limited in the embodiments of this application. The network side device 12 may be a base station or a core network device. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a type of the base station is not limited.

With reference to the accompanying drawings, a PDCCH monitoring processing method provided in the embodiments of this application is described by using some embodiments and application scenarios.

Usually, when the communication system operates on a high-frequency band, there is a relatively large subcarrier spacing. Based on the PDCCH detection capability defined for each slot or the plurality of symbols, the terminal may need to perform PDCCH monitoring for a plurality of times in one subcarrier spacing, resulting in large power consumption of the terminal.

Figure 2:
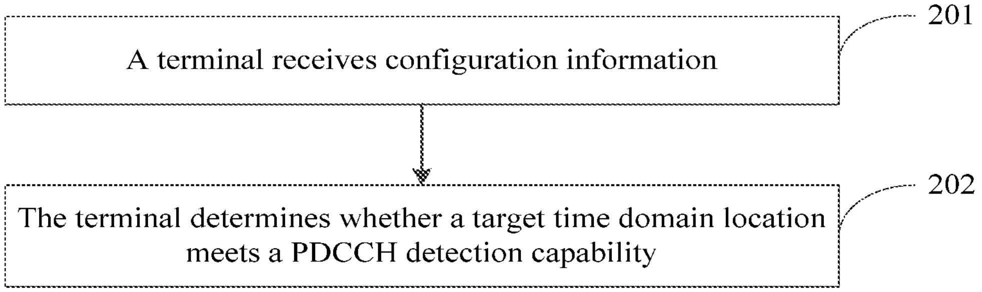
FIG. 2 is a flowchart of a PDCCH monitoring processing method according to an embodiment of this application.

Referring to FIG. 2, FIG. 2 is a flowchart of a PDCCH monitoring processing method according to an embodiment of this application. As shown in FIG. 2, the method includes the following steps:

Step 201: A terminal receives configuration information, where the configuration information is used to configure a target time domain location of PDCCH monitoring.

Step 202: The terminal determines whether the target time domain location meets a PDCCH detection capability.

The target time domain location includes at least one first time unit, the PDCCH detection capability includes a blind detection (BD) budget restriction or a control channel element (CCE) budget restriction defined by at least two second time units, the second time unit includes N first time units, and N is an integer greater than 1.

In this embodiment of this application, a network side device may determine the foregoing configuration information based on the PDCCH detection capability. It should be understood that there is a PDCCH monitoring occasion at the target time domain location. For example, the PDCCH monitoring occasion may be configured based on a first time unit. That the PDCCH monitoring occasion is configured in a specified first time unit may be understood as that there is a PDCCH monitoring configuration in the first time unit, and the PDCCH monitoring configuration may also be referred to as PDCCH monitoring configuration information. Time lengths of the first time unit and the second time unit may be set according to an actual requirement. For example, in some embodiments, the first time unit may be a symbol, and the second time unit may be a slot. Certainly, in another embodiment, the first time unit may be also set to a symbol, and the second time unit may have a time granularity greater than one slot, for example, may be two slots or 1.5 slots. This is not limited herein. In addition, the first time unit may alternatively have a time granularity greater than one symbol.

It should be noted that, in this embodiment of this application, if it is determined that the target time domain location meets the PDCCH detection capability, the terminal may perform PDCCH monitoring based on the target time domain location. If it is determined that the target time domain location does not meet the PDCCH detection capability, the terminal may consider the configuration information as incorrect configuration information. In this case, behavior of the terminal may include any one of the following:

- discarding the configuration information or not performing PDCCH monitoring in the target time domain location; and
- performing PDCCH monitoring in at least partial time domain locations at the target time domain location, where the at least partial time domain locations may be understood as at least partial first time units in all first time units included in the target time domain location.

In this embodiment of this application, a terminal receives configuration information, where the configuration information is used to configure a target time domain location of PDCCH monitoring; and the terminal determines whether the target time domain location meets a PDCCH detection capability, where the target time domain location includes at least one first time unit, the PDCCH detection capability includes a blind detection budget restriction or a CCE budget restriction defined based on at least two second time units, the second time unit includes N first time units, and N is an integer greater than 1. Due to the blind detection budget restriction or the control channel element CCE budget restriction defined based on the at least two second time units, when a network side device configures the target time domain location of PDCCH monitoring based on the PDCCH detection capability, a quantity of PDCCH monitoring times can be reduced. Therefore, in this embodiment of this application, power consumption of a terminal operating on a high-frequency band is reduced. In addition, because the quantity of PDCCH monitoring times is reduced, implementation difficulty of the terminal can be reduced.

It should be understood that, that the terminal operates on the high-frequency band may be understood that the terminal may perform communication based on the high-frequency band, and a frequency band range of the high-frequency band may be defined according to an actual situation. For example, in some embodiments, for an NR communication system, a frequency band greater than 52.6 GHz may be determined as a high-frequency band.

Optionally, in some embodiments, before the determining, by the terminal, whether the target time domain location meets a PDCCH detection capability, the method further includes:

- determining, by the terminal according to first target information, a time domain location of a first span based on the first time unit, where the time domain location of the first span is used to determine whether the target time domain location meets the PDCCH detection capability, and the first target information includes the target time domain location.

In this embodiment of this application, a maximum length of the first span may be stipulated in a protocol or configured by the network side device. The first span may be understood as a time span that includes one or more first time units. Optionally, in some embodiments, each first time unit within the first span has a PDCCH monitoring configuration, and the first span does not allow crossing of the second time unit. That is, in this embodiment of this application, the first span meets at least one of the following:

- that the time domain location of the first span is located within one second time unit; or
- that each first time unit within the first span has a PDCCH monitoring configuration.

Optionally, in some embodiments, the first target information further includes a PDCCH monitoring capability parameter reported by the terminal.

In this embodiment of this application, the network side device may determine, based on the PDCCH monitoring capability parameter reported by the terminal, the configuration information used to configure the target time domain location of PDCCH monitoring. Content included in the PDCCH monitoring capability parameter reported by the terminal may be set according to an actual requirement. For example, in some embodiments, the PDCCH monitoring capability parameter may include the maximum length of the first span. Certainly, another parameter may be further included in another embodiment. This is not limited herein.

It should be noted that a manner of determining the first span that is based on the first time unit may be set according to an actual requirement. For example, the first span may be determined based on different time granularities. The following describes this by using some embodiments.

In some embodiments, in a case that the time domain location of the first span is determined in units of one second time unit, the first span meets at least one of the following:

that the first span does not exist within a second time unit having no PDCCH monitoring configuration; or that the time domain location of the first span is determined according to a first preset rule for any second time unit having the PDCCH monitoring configuration, where the first span is repeated on all second time units configured with PDCCH monitoring.

In this embodiment of this application, each second time unit may be considered as one unit. If all first time units included in a specified second time unit has no PDCCH monitoring configuration, the second time unit has no PDCCH monitoring configuration. In this case, there is no first span within the second time unit.

If at least one first time unit in a specified second time unit has a PDCCH monitoring configuration, it may be determined that the second time unit has the PDCCH monitoring configuration. In this case, the time domain location of the first span may be determined according to the first preset rule.

Optionally, in some embodiments, the first preset rule includes:

that a maximum length of the first span is Y first time units, and Y is an integer greater than 1;

that a start location of a 1st first span is a start location of a first target time unit on all second time units having the PDCCH monitoring configuration, the first target time unit is a 1st first time unit that is in L1 first time units and that is arranged in ascending order of first location numbers, the first location number is a sorting number of the first time unit within a second time unit in which the first time unit is located, the L1 first time units are all first time units having the PDCCH monitoring configuration, and L1 is a positive integer; and that a start location of an (n+1)-th first span is a start location of a second target time unit on all second time units having the PDCCH monitoring configuration, the second target time unit is a 1st first time unit that is in L2 first time units and that is arranged in ascending order of the first location numbers, the L2 first time units are all first time units that are in the L1 first time units and that are located behind an end location of an n-th first span, and both n and L2 are positive integers.

For ease of understanding, it may be assumed that the first time unit is a symbol, and the second time unit is a slot, where a value of N is 14, and each second time unit includes symbols 0 to 13. It is assumed that the maximum value of the first span is 2, a symbol 2, a symbol 3, a symbol 9, and a symbol 10 in a 1st slot has the PDCCH monitoring configuration, and a symbol 5 and a symbol 6 in a 2nd slot has the PDCCH monitoring configuration. In this embodiment of this application, a start location of a 1st first span is a start location of the symbol 2, a start location of a 2nd first span is a start location of the symbol 6, and a start location of a 3rd first span is a start location of the symbol 9.

In other words, in this embodiment of this application, the first span does not exist in a slot having no PDCCH monitoring configuration. For a slot having the PDCCH monitoring configuration, a bitmap b(l) is first obtained, where $0 \le l \le 13$. If an $l^{th}$ symbol of any slot has the PDCCH monitoring configuration, b(l)=1; otherwise, b(l)=0. The 1st first span starts from minimum l of b(l)=1 and then follows Y symbols; a next first span starts from minimum l of b(l)=1 excluding the first span and then follows Y symbols; and the foregoing process continues until this slot ends.

Optionally, in some embodiments, the first preset rule includes:

that a maximum length of the first span is Y first time units, and Y is an integer greater than 1;

that a start location of a 1st first span is a start location of a first target time unit on all second time units having the PDCCH monitoring configuration, the first target time unit is a 1st first time unit that is in L1 first time units and that is arranged in ascending order of first location numbers, the first location number is a sorting number of the first time unit within a second time unit in which the first time unit is located, the L1 first time units are all first time units having the PDCCH monitoring configuration, and L1 is a positive integer; and that a start location of an (n+1)-th first span is a start location of a second target time unit on all second time units having the PDCCH monitoring configuration, the second target time unit is a 1st first time unit that is in L2 first time units and that is arranged in ascending order of the first location numbers, the L2 first time units are all first time units that are in the L1 first time units and that are located behind an end location of an n-th first span, and both n and L2 are positive integers.

In this embodiment of this application, the time domain location of the first span may be different in all second time units having the PDCCH monitoring configuration.

For ease of understanding, it may be assumed that the first time unit is a symbol, and the second time unit is a slot, where a value of N is 14, and each second time unit includes symbols 0 to 13. It is assumed that the maximum value of the first span is 2, a symbol 2, a symbol 3, a symbol 9, and a symbol 10 in a 1st slot has the PDCCH monitoring configuration, and a symbol 5 and a symbol 6 in a 2nd slot has the PDCCH monitoring configuration. In this embodiment of this application, a start location of a 1st first span within a 1st second time unit is a start location of the symbol 2 and a start location of a 2nd first span is a start location of the symbol 9; and a start location of a 1st first span within a 2nd second time unit is a start location of the symbol 5.

In other words, in this embodiment of this application, for each slot, a bitmap b(l) is obtained, where $0 \le l \le 13$. If an $l^{th}$ symbol in this slot has the PDCCH monitoring configuration, b(l)=1; otherwise, b(l)=0. For each slot, the 1st first span starts from minimum l of b(l)=1 and then follows Y symbols; a next first span starts from minimum l of b(l)=1 excluding the first span and then follows Y symbols; and the foregoing process continues until this slot ends.

Optionally, in some embodiments, in a case that the time domain location of the first span is determined by using M second time units as a second time granularity, the time domain location of the first span is determined according to a second preset rule on a second object, where the second object is any time unit with the second time granularity, and the second preset rule includes:

that a start location of a 1st first span is a start location of a fifth target time unit on all second time units having a PDCCH monitoring configuration, the fifth target time unit is a 1st first time unit that is in L5 first time units and that is arranged in ascending order of second location numbers, the second location number is a sorting number of the first time unit within a second time unit in which the first time unit is located, the L5 first time units are all first time units having the PDCCH monitoring configuration, and L5 is a positive integer; and that a start location of an (n+1)-th first span is a start location of a sixth target time unit on all second time units having the PDCCH monitoring configuration, the sixth target time unit is a 1st first time unit that is in L6 first time units and that is arranged in ascending order of the second location numbers, the L6 first time units are all first time units that are in the L5 first time units and that are located behind an end location of an n-th first span, and both n and L6 are positive integers.

In this embodiment of this application, the time domain location of the first span is repeated in every M second time units. That is, the time domain location of the first span is repeated in each second time unit.

It should be understood that, in this embodiment of this application, numbers of first time units in a second time unit may be consecutive. For example, two slots are used as the second time unit for description. One second time unit includes 28 first time units, that is, symbols 0 to 27. For example, a bitmap b(l) that is used to indicate whether the PDCCH monitoring configuration exists may be first obtained by using M slots as a cycle, where $0 \le l \le 14 \times M-1$. If an $l^{th}$ symbol of any M slots has the PDCCH monitoring configuration, b(l)=1; otherwise, b(l)=0. The 1st first span starts from minimum l of b(l)=1 and then follows Y symbols; a next first span starts from minimum l of b(l)=1 excluding the first span and then follows Y symbols; and the foregoing process continues until the M slots end.

Optionally, in some embodiments, the PDCCH detection capability includes: that an interval between 1st first time units of any two consecutive first spans is greater than or equal to first preset duration.

In this embodiment of this application, after the time domain location of the first span is determined, whether the PDCCH detection capability is met may be determined based on a time domain interval between the 1st first time units of the any two consecutive first spans. A size of the first preset duration may be set according to an actual requirement, for example, may be X symbols or slots. A value of X may be stipulated in a protocol, configured by the network side device, or reported by the terminal. The first preset duration may be understood as a parameter in the PDCCH monitoring capability parameter.

Optionally, in some embodiments, the PDCCH detection capability includes at least one of the following:

that a first time unit having a PDCCH monitoring configuration is located at a first preset location of a second time unit in which the first time unit is located; or that a second time unit having the PDCCH monitoring configuration is located at a second preset location in every J second time units, and J is an integer greater than 1.

In this embodiment of this application, whether the PDCCH detection capability is met may be determined according to whether the first time unit included in the target time domain location is at the first preset location of the second time unit. For example, in some embodiments, the first preset location may be the first two time domain locations of the second time unit.

In this embodiment of this application, that a second time unit having the PDCCH monitoring configuration is located at a second preset location in every J second time units may be understood as: whether the second time unit having the PDCCH monitoring configuration is in a specific second time unit. The second preset location may be set according to an actual requirement. For example, in some embodiments, the second preset location includes any one of the following: the first K second time units, where K is a positive integer less than or equal to J; the last K second time units; any consecutive K second time units; and any K second time units.

Optionally, values of J and K may be stipulated in a protocol, configured by the network side device, or reported by the terminal.

Optionally, in some embodiments, before the determining, by the terminal, whether the target time domain location meets a PDCCH detection capability, the method further includes:

determining, by the terminal according to second target information, a time domain location of a second span based on the second time unit, where the time domain location of the second span is used to determine whether the target time domain location meets the PDCCH detection capability, and the second target information includes the target time domain location.

In this embodiment of this application, the second span may be understood as a time span including one or more second time units. Optionally, in some embodiments, a maximum length of the second span may be stipulated in a protocol or configured by the network side device.

Optionally, in some embodiments, the second target information further includes the PDCCH monitoring capability parameter reported by the terminal.

In this embodiment of this application, the network side device may determine, based on the PDCCH monitoring capability parameter reported by the terminal, the configuration information used to configure the target time domain location of PDCCH monitoring. Content included in the PDCCH monitoring capability parameter reported by the terminal may be set according to an actual requirement. For example, in some embodiments, the PDCCH monitoring capability parameter may include the maximum length of the second span. Certainly, another parameter may be further included in another embodiment. This is not limited herein.

Optionally, in some embodiments, the PDCCH detection capability includes:

that an interval between 1st second time units of any two consecutive second spans is greater than or equal to second preset duration.

In this embodiment of this application, after the time domain location of the second span is determined, whether the PDCCH detection capability is met may be determined based on a time domain interval between the 1st second time units of the any two consecutive second spans. A size of the second preset duration may be set according to an actual requirement, for example, may be X1 slots. A value of X1 may be stipulated in a protocol, configured by the network side device, or reported by the terminal. The second preset duration may be understood as a parameter in the PDCCH monitoring capability parameter.

To better understand this application, the following describes implementation of this application by using some examples.

Embodiment 1: It is assumed that the first time unit is a symbol, and the second time unit is a slot. It is determined, according to a search space configuration, whether each symbol has the PDCCH monitoring configuration, and whether the symbol having the PDCCH monitoring configuration meets the PDCCH monitoring capability is determined by using the following method. For example, the following steps are included:

Step 1: Determine, according to the following method, a time domain location of a first span that is based on a symbol.

Method 1: The first span does not exist in a slot having no PDCCH monitoring configuration. For a slot having the PDCCH monitoring configuration, a bitmap b(l) is first obtained, where 0≤l≤13. If an $l^{th}$ symbol of any slot has the PDCCH monitoring configuration, b(l)=1; otherwise, b(l)=0. The 1st first span starts from minimum l of b(l)=1 and then follows Y symbols; a next first span starts from minimum l of b(l)=1 excluding the first span and then follows Y symbols; and the foregoing process continues until this slot ends.

Method 2: For each slot, a bitmap b(l) is obtained, where 0≤l≤13. If an $l^{th}$ symbol in this slot has the PDCCH monitoring configuration, b(l)=1; otherwise, b(l)=0. For each slot, the 1st first span starts from minimum l of b(l)=1 and then follows Y symbols; a next first span starts from minimum l of b(l)=1 excluding the first span and then follows Y symbols; and the foregoing process continues until this slot ends.

Method 3: Assuming that M slots is a cycle, a bitmap b(l) that is used to indicate whether the PDCCH monitoring configuration exists may be first obtained, where 0≤l≤14×M−1. If an $l^{th}$ symbol of any M slots has the PDCCH monitoring configuration, b(l)=1; otherwise, b(l)=0. The 1st first span starts from minimum l of b(l)=1 and then follows Y symbols; a next first span starts from minimum l of b(l)=1 excluding the first span and then follows Y symbols; and the foregoing process continues until the M slots end.

Step 2: After the time domain location of the first span is determined, determine, according to whether a distance between 1st symbols of any consecutive first spans is greater than or equal to first preset duration, whether a configured PDCCH monitoring symbol location meets a PDCCH monitoring capability of UE, where the first preset duration is X symbols or slots.

Embodiment 2: It is assumed that the first time unit is a symbol, and the second time unit is a slot. It is determined, according to a search space configuration, whether each symbol has the PDCCH monitoring configuration, and whether the symbol having the PDCCH monitoring configuration meets the PDCCH monitoring capability is determined by using the following method. For example, the following steps are included:

Step 1: Determine, according to the following method, whether a slot having a PDCCH monitoring configuration meets a PDCCH monitoring capability.

Method 4: Determine whether the slot having the PDCCH monitoring configuration is in a specified slot in J slots, for example, in the first K slots.

Method 5: After a second span that is based on a slot is determined according to a location of the slot having the PDCCH monitoring configuration determine, according to whether a distance between 1st slots of any consecutive second spans is greater than or equal to J slots, whether the configured PDCCH monitoring slot location meets the PDCCH monitoring capability of the terminal.

Step 2: Determine whether a symbol having the PDCCH monitoring configuration meets the PDCCH monitoring capability.

Method 6: Determine whether the symbol having the PDCCH monitoring configuration is on a specified symbol in one slot.

Method 7: After the time domain location of the first span that is based on the symbol is determined in the following manner, determine, according to whether a distance between 1st symbols of any consecutive first spans is greater than or equal to the first preset duration, whether the configured PDCCH monitoring symbol location meets the PDCCH monitoring capability of the UE, where the first preset duration is X symbols or slots.

Manner 1: The first span does not exist in a slot having no PDCCH monitoring configuration. For a slot having the PDCCH monitoring configuration, a bitmap b(l) is first obtained, where 0≤l≤13. If an $l^{th}$ symbol of any slot has the PDCCH monitoring configuration, b(l)=1; otherwise, b(l)=0. The 1st first span starts from minimum l of b(l)=1 and then follows Y symbols; a next first span starts from minimum l of b(l)=1 excluding the first span and then follows Y symbols; and the foregoing process continues until this slot ends.

Manner 2: For each slot, a bitmap b(l) is obtained, where 0≤l≤13. If an $l^{th}$ symbol in this slot has the PDCCH monitoring configuration, b(l)=1; otherwise, b(l)=0. For each slot, the 1st first span starts from minimum l of b(l)=1 and then follows Y symbols; a next first span starts from minimum l of b(l)=1 excluding the first span and then follows Y symbols; and the foregoing process continues until this slot ends.

Figure 3:
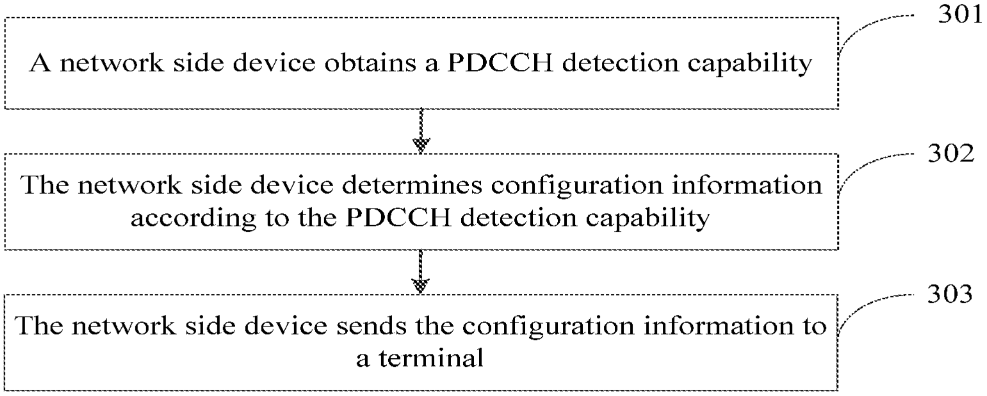
FIG. 3 is a flowchart of a PDCCH monitoring configuration method according to an embodiment of this application.

Referring to FIG. 3, FIG. 3 is a flowchart of a physical downlink control channel PDCCH monitoring configuration method according to an embodiment of this application. As shown in FIG. 3, the method includes the following steps:

Step 301: A network side device obtains a PDCCH detection capability.

Step 302: The network side device determines configuration information according to the PDCCH detection capability, where the configuration information is used to configure a target time domain location of PDCCH monitoring.

Step 303: The network side device sends the configuration information to a terminal.

The target time domain location includes at least one first time unit, the target time domain location meets the PDCCH detection capability, the PDCCH detection capability includes a blind detection budget restriction or a control channel element CCE budget restriction defined based on at least two second time units, the second time unit includes N first time units, and N is an integer greater than 1.

Optionally, that the target time domain location meets the PDCCH detection capability includes:

that a first span based on the first time unit meets the PDCCH detection capability, where the first span is determined based on first target information, and the first target information includes the target time domain location.

Optionally, the first target information further includes a PDCCH monitoring capability parameter reported by the terminal.

Optionally, in a case that the time domain location of the first span is determined in units of one second time unit, the first span meets at least one of the following:

that the first span does not exist within a second time unit having no PDCCH monitoring configuration; or that the time domain location of the first span is determined according to a first preset rule for any second time unit having the PDCCH monitoring configuration, where the first span is repeated on all second time units configured with PDCCH monitoring.

Optionally, the first preset rule includes:

that a maximum length of the first span is Y first time units, and Y is an integer greater than 1;

that a start location of a 1st first span is a start location of a first target time unit on all second time units having the PDCCH monitoring configuration, the first target time unit is a 1st first time unit that is in L1 first time units and that is arranged in ascending order of first location numbers, the first location number is a sorting number of the first time unit within a second time unit in which the first time unit is located, the L1 first time units are all first time units having the PDCCH monitoring configuration, and L1 is a positive integer; and that a start location of an (n+1)-th first span is a start location of a second target time unit on all second time units having the PDCCH monitoring configuration, the second target time unit is a 1st first time unit that is in L2 first time units and that is arranged in ascending order of the first location numbers, the L2 first time units are all first time units that are in the L1 first time units and that are located behind an end location of an n-th first span, and both n and L2 are positive integers.

Optionally, in a case that the time domain location of the first span is determined by using one second time unit as a first time granularity, the time domain location of the first span is determined according to a second preset rule on a first object, where the first object is any time unit with the first time granularity, and the second preset rule includes:

that a maximum length of the first span is Y first time units, and Y is an integer greater than 1;

that a start location of a 1st first span is a start location of a third target time unit on the first object, the third target time unit is a 1st first time unit that is in L3 first time units and that is arranged in ascending order of first location numbers, the first location number is a sorting number of the first time unit within a second time unit in which the first time unit is located, the L3 first time units are all first time units having a PDCCH monitoring configuration on the first object, and L3 is a positive integer; and that a start location of an (n+1)-th first span is a start location of a fourth target time unit on the first object, the fourth target time unit is a 1st first time unit that is in L4 first time units and that is arranged in ascending order of the first location numbers, the L4 first time units are all first time units that are in the L3 first time units and that are located behind an end location of an n-th first span, and both n and L4 are positive integers.

Optionally, in a case that the time domain location of the first span is determined by using M second time units as a second time granularity, the time domain location of the first span is determined according to a second preset rule on a second object, where the second object is any time unit with the second time granularity, and the second preset rule includes:

that a start location of a 1st first span is a start location of a fifth target time unit on all second time units having a PDCCH monitoring configuration, the fifth target time unit is a 1st first time unit that is in L5 first time units and that is arranged in ascending order of second location numbers, the second location number is a sorting number of the first time unit within a second time unit in which the first time unit is located, the L5 first time units are all first time units having the PDCCH monitoring configuration, and L5 is a positive integer; and that a start location of an (n+1)-th first span is a start location of a sixth target time unit on all second time units having the PDCCH monitoring configuration, the sixth target time unit is a 1st first time unit that is in L6 first time units and that is arranged in ascending order of the second location numbers, the L6 first time units are all first time units that are in the L5 first time units and that are located behind an end location of an n-th first span, and both n and L6 are positive integers.

Optionally, the time domain location of the first span is repeated in every M second time units.

Optionally, the PDCCH detection capability includes: that an interval between 1st first time units of any two consecutive first spans is greater than or equal to first preset duration.

Optionally, the first span meets at least one of the following:

that the time domain location of the first span is located within one second time unit; or that each first time unit within the first span has a PDCCH monitoring configuration.

Optionally, the PDCCH detection capability includes at least one of the following:

that a first time unit having a PDCCH monitoring configuration is located at a first preset location of a second time unit in which the first time unit is located; or that a second time unit having the PDCCH monitoring configuration is located at a second preset location in every J second time units, and J is an integer greater than 1.

Optionally, the second preset location includes any one of the following: the first K second time units, where K is a positive integer less than or equal to J; the last K second time units; any consecutive K second time units; and any K second time units.

Optionally, that the target time domain location meets the PDCCH detection capability includes:

that a second span based on the second time unit meets the PDCCH detection capability, where the second span is determined based on second target information, and the second target information includes the target time domain location.

Optionally, the second target information further includes the PDCCH monitoring capability parameter reported by the terminal.

Optionally, the PDCCH detection capability includes: that an interval between 1st second time units of any two consecutive second spans is greater than or equal to second preset duration.

It should be noted that this embodiment is used as an implementation of the network side device corresponding to the embodiment shown in FIG. 2. For an implementation of this embodiment, refer to the related descriptions of the embodiment shown in FIG. 2. A same beneficial effect can also be achieved. To avoid repeated descriptions, details are not described again herein.

It should be noted that the PDCCH monitoring processing method provided in the embodiments of this application may be performed by a PDCCH monitoring processing apparatus, or a control module that is in the PDCCH monitoring processing apparatus and that is configured to perform the PDCCH monitoring processing method. In the embodiments of this application, an example in which the PDCCH monitoring processing apparatus performs the PDCCH monitoring processing method is used to describe the PDCCH monitoring processing apparatus provided in the embodiments of this application.

Figure 4:
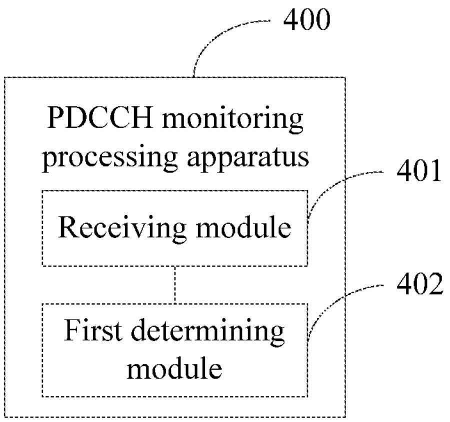
FIG. 4 is a structural diagram of a PDCCH monitoring processing apparatus according to an embodiment of this application.

Referring to FIG. 4, FIG. 4 is a structural diagram of a PDCCH monitoring processing apparatus according to an embodiment of this application. As shown in FIG. 4, a PDCCH monitoring processing apparatus 400 includes:

a receiving module 401, configured to receive configuration information, where the configuration information is used to configure a target time domain location of PDCCH monitoring; and a first determining module 402, configured to determine whether the target time domain location meets a PDCCH detection capability, where the target time domain location includes at least one first time unit, the PDCCH detection capability includes a blind detection budget restriction or a control channel element CCE budget restriction defined based on at least two second time units, the second time unit includes N first time units, and N is an integer greater than 1.

Optionally, the PDCCH monitoring processing apparatus 400 further includes:

a second determining module, configured to determine, according to first target information, a time domain location of a first span based on the first time unit, where the time domain location of the first span is used to determine whether the target time domain location meets the PDCCH detection capability, and the first target information includes the target time domain location.

The first target information further includes a PDCCH monitoring capability parameter reported by the terminal.

Optionally, in a case that the time domain location of the first span is determined in units of one second time unit, the first span meets at least one of the following:

that the first span does not exist within a second time unit having no PDCCH monitoring configuration; or that the time domain location of the first span is determined according to a first preset rule for any second time unit having the PDCCH monitoring configuration, where the first span is repeated on all second time units configured with PDCCH monitoring.

Optionally, the first preset rule includes:

that a maximum length of the first span is Y first time units, and Y is an integer greater than 1;

that a start location of a 1st first span is a start location of a first target time unit on all second time units having the PDCCH monitoring configuration, the first target time unit is a 1st first time unit that is in L1 first time units and that is arranged in ascending order of first location numbers, the first location number is a sorting number of the first time unit within a second time unit in which the first time unit is located, the L1 first time units are all first time units having the PDCCH monitoring configuration, and L1 is a positive integer; and that a start location of an (n+1)-th first span is a start location of a second target time unit on all second time units having the PDCCH monitoring configuration, the second target time unit is a 1st first time unit that is in L2 first time units and that is arranged in ascending order of the first location numbers, the L2 first time units are all first time units that are in the L1 first time units and that are located behind an end location of an n-th first span, and both n and L2 are positive integers.

Optionally, in a case that the time domain location of the first span is determined by using one second time unit as a first time granularity, the time domain location of the first span is determined according to a second preset rule on a first object, where the first object is any time unit with the first time granularity, and the second preset rule includes:

that a maximum length of the first span is Y first time units, and Y is an integer greater than 1;

that a start location of a 1st first span is a start location of a third target time unit on the first object, the third target time unit is a 1st first time unit that is in L3 first time units and that is arranged in ascending order of first location numbers, the first location number is a sorting number of the first time unit within a second time unit in which the first time unit is located, the L3 first time units are all first time units having a PDCCH monitoring configuration on the first object, and L3 is a positive integer; and that a start location of an (n+1)-th first span is a start location of a fourth target time unit on the first object, the fourth target time unit is a 1st first time unit that is in L4 first time units and that is arranged in ascending order of the first location numbers, the L4 first time units are all first time units that are in the L3 first time units and that are located behind an end location of an n-th first span, and both n and L4 are positive integers.

Optionally, in a case that the time domain location of the first span is determined by using M second time units as a second time granularity, the time domain location of the first span is determined according to a second preset rule on a second object, where the second object is any time unit with the second time granularity, and the second preset rule includes:

that a start location of a 1st first span is a start location of a fifth target time unit on all second time units having a PDCCH monitoring configuration, the fifth target time unit is a 1st first time unit that is in L5 first time units and that is arranged in ascending order of second location numbers, the second location number is a sorting number of the first time unit within a second time unit in which the first time unit is located, the L5 first time units are all first time units having the PDCCH monitoring configuration, and L5 is a positive integer; and that a start location of an (n+1)-th first span is a start location of a sixth target time unit on all second time units having the PDCCH monitoring configuration, the sixth target time unit is a 1st first time unit that is in L6 first time units and that is arranged in ascending order of the second location numbers, the L6 first time units are all first time units that are in the L5 first time units and that are located behind an end location of an n-th first span, and both n and L6 are positive integers.

Optionally, the time domain location of the first span is repeated in every M second time units.

Optionally, the PDCCH detection capability includes: that an interval between 1st first time units of any two consecutive first spans is greater than or equal to first preset duration.

Optionally, the first span meets at least one of the following:

that the time domain location of the first span is located within one second time unit; or that each first time unit within the first span has a PDCCH monitoring configuration.

Optionally, the PDCCH detection capability includes at least one of the following:

that a first time unit having a PDCCH monitoring configuration is located at a first preset location of a second time unit in which the first time unit is located; or that a second time unit having the PDCCH monitoring configuration is located at a second preset location in every J second time units, and J is an integer greater than 1.

Optionally, the second preset location includes any one of the following: the first K second time units, where K is a positive integer less than or equal to J; the last K second time units; any consecutive K second time units; and any K second time units.

Optionally, the PDCCH monitoring processing apparatus 400 further includes:

a fourth determining module, configured to determine, according to second target information, a time domain location of a second span based on the second time unit, where the time domain location of the second span is used to determine whether the target time domain location meets the PDCCH detection capability, and the second target information includes the target time domain location.

Optionally, the second target information further includes the PDCCH monitoring capability parameter reported by the terminal.

Optionally, the PDCCH detection capability includes: that an interval between 1st second time units of any two consecutive second spans is greater than or equal to second preset duration.

The PDCCH monitoring processing apparatus provided in this embodiment of this application can implement the processes in the method embodiment in FIG. 2. To avoid repetition, details are not described herein again.

It should be noted that the PDCCH monitoring configuration method provided in the embodiments of this application may be performed by a PDCCH monitoring configuration apparatus, or a control module that is in the PDCCH monitoring configuration apparatus and that is configured to perform the PDCCH monitoring configuration method. In the embodiments of this application, an example in which the PDCCH monitoring configuration apparatus performs the PDCCH monitoring configuration method is used to describe the PDCCH monitoring configuration apparatus provided in the embodiments of this application.

Figure 5:
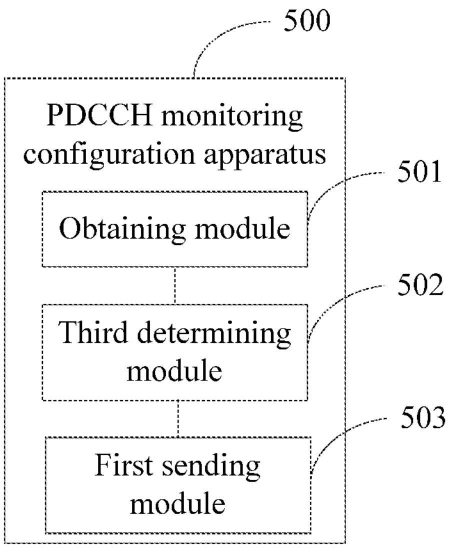
FIG. 5 is a structural diagram of a PDCCH monitoring configuration apparatus according to an embodiment of this application.

Referring to FIG. 5, FIG. 5 is a structural diagram of a PDCCH monitoring configuration apparatus according to an embodiment of this application. As shown in FIG. 5, a PDCCH monitoring configuration apparatus 500 includes:

an obtaining module 501, configured to obtain a PDCCH detection capability;

a third determining module 502, configured to determine configuration information according to the PDCCH detection capability, where the configuration information is used to configure a target time domain location of PDCCH monitoring; and a first sending module 503, configured to send the configuration information to a terminal, where the target time domain location includes at least one first time unit, the target time domain location meets the PDCCH detection capability, the PDCCH detection capability includes a blind detection budget restriction or a control channel element CCE budget restriction defined based on at least two second time units, the second time unit includes N first time units, and N is an integer greater than 1.

Optionally, that the target time domain location meets the PDCCH detection capability includes:

that a first span based on the first time unit meets the PDCCH detection capability, where the first span is determined based on first target information, and the first target information includes the target time domain location.

Optionally, the first target information further includes a PDCCH monitoring capability parameter reported by the terminal.

Optionally, in a case that the time domain location of the first span is determined in units of one second time unit, the first span meets at least one of the following:

that the first span does not exist within a second time unit having no PDCCH monitoring configuration; or that the time domain location of the first span is determined according to a first preset rule for any second time unit having the PDCCH monitoring configuration, where the first span is repeated on all second time units configured with PDCCH monitoring.

Optionally, the first preset rule includes:

that a maximum length of the first span is Y first time units, and Y is an integer greater than 1;

that a start location of a 1st first span is a start location of a first target time unit on all second time units having the PDCCH monitoring configuration, the first target time unit is a 1st first time unit that is in L1 first time units and that is arranged in ascending order of first location numbers, the first location number is a sorting number of the first time unit within a second time unit in which the first time unit is located, the L1 first time units are all first time units having the PDCCH monitoring configuration, and L1 is a positive integer; and that a start location of an (n+1)-th first span is a start location of a second target time unit on all second time units having the PDCCH monitoring configuration, the second target time unit is a 1st first time unit that is in L2 first time units and that is arranged in ascending order of the first location numbers, the L2 first time units are all first time units that are in the L1 first time units and that are located behind an end location of an n-th first span, and both n and L2 are positive integers.

Optionally, in a case that the time domain location of the first span is determined by using one second time unit as a first time granularity, the time domain location of the first span is determined according to a second preset rule on a first object, where the first object is any time unit with the first time granularity, and the second preset rule includes:

that a maximum length of the first span is Y first time units, and Y is an integer greater than 1;

that a start location of a 1st first span is a start location of a third target time unit on the first object, the third target time unit is a 1st first time unit that is in L3 first time units and that is arranged in ascending order of first location numbers, the first location number is a sorting number of the first time unit within a second time unit in which the first time unit is located, the L3 first time units are all first time units having a PDCCH monitoring configuration on the first object, and L3 is a positive integer; and that a start location of an (n+1)-th first span is a start location of a fourth target time unit on the first object, the fourth target time unit is a 1st first time unit that is in L4 first time units and that is arranged in ascending order of the first location numbers, the L4 first time units are all first time units that are in the L3 first time units and that are located behind an end location of an n-th first span, and both n and L4 are positive integers.

Optionally, in a case that the time domain location of the first span is determined by using M second time units as a second time granularity, the time domain location of the first span is determined according to a second preset rule on a second object, where the second object is any time unit with the second time granularity, and the second preset rule includes:

that a start location of a 1st first span is a start location of a fifth target time unit on all second time units having a PDCCH monitoring configuration, the fifth target time unit is a 1st first time unit that is in L5 first time units and that is arranged in ascending order of second location numbers, the second location number is a sorting number of the first time unit within a second time unit in which the first time unit is located, the L5 first time units are all first time units having the PDCCH monitoring configuration, and L5 is a positive integer; and that a start location of an (n+1)-th first span is a start location of a sixth target time unit on all second time units having the PDCCH monitoring configuration, the sixth target time unit is a 1st first time unit that is in L6 first time units and that is arranged in ascending order of the second location numbers, the L6 first time units are all first time units that are in the L5 first time units and that are located behind an end location of an n-th first span, and both n and L6 are positive integers.

Optionally, the time domain location of the first span is repeated in every M second time units.

Optionally, the PDCCH detection capability includes: that an interval between 1st first time units of any two consecutive first spans is greater than or equal to first preset duration.

Optionally, the first span meets at least one of the following:

that the time domain location of the first span is located within one second time unit; or that each first time unit within the first span has a PDCCH monitoring configuration.

Optionally, the PDCCH detection capability includes at least one of the following:

that a first time unit having a PDCCH monitoring configuration is located at a first preset location of a second time unit in which the first time unit is located; or that a second time unit having the PDCCH monitoring configuration is located at a second preset location in every J second time units, and J is an integer greater than 1.

Optionally, the second preset location includes any one of the following: the first K second time units, where K is a positive integer less than or equal to J; the last K second time units; any consecutive K second time units; and any K second time units.

Optionally, that the target time domain location meets the PDCCH detection capability includes:

that a second span based on the second time unit meets the PDCCH detection capability, where the second span is determined based on second target information, and the second target information includes the target time domain location.

Optionally, the second target information further includes the PDCCH monitoring capability parameter reported by the terminal.

Optionally, the PDCCH detection capability includes: that an interval between 1st second time units of any two consecutive second spans is greater than or equal to second preset duration.

The PDCCH monitoring configuration apparatus provided in this embodiment of this application can implement the processes in the method embodiment in FIG. 3. To avoid repetition, details are not described herein again.

The PDCCH monitoring processing apparatus and the PDCCH monitoring configuration apparatus in the embodiments of this application may be an apparatus, an apparatus or an electronic device with an operating system, or may be a component, an integrated circuit, or a chip in a terminal. The apparatus may be a mobile terminal, or a non-mobile terminal. For example, the mobile terminal may include but is not limited to the types of the foregoing listed terminal 11, and the non-mobile terminal may be a server, a network attached storage (NAS), a personal computer (PC), a television (TV), an automated teller machine, or a self-service machine. This is not limited in the embodiments of this application.

The PDCCH monitoring processing apparatus and the PDCCH monitoring configuration apparatus provided in the embodiments of this application can implement the processes implemented in the method embodiments in FIG. 2 to FIG. 3, and achieve a same technical effect. To avoid repetition, details are not described herein again.

Figure 6:
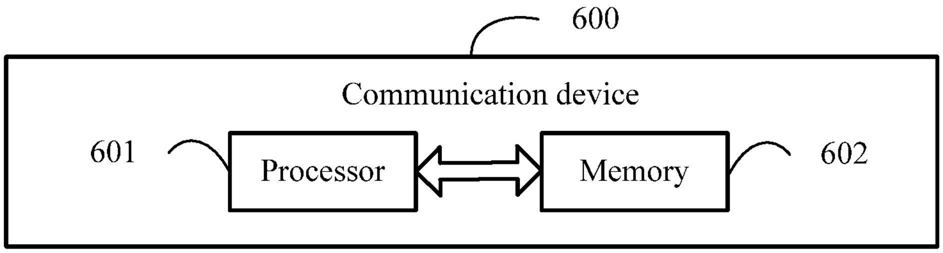
FIG. 6 is a structural diagram of a communication device according to an embodiment of this application.

Optionally, as shown in FIG. 6, an embodiment of this application further provides a communication device 600, including a processor 601, a memory 602, and a program or an instruction stored in the memory 602 and executable on the processor 601. For example, when the communication device 600 is a terminal, and when the program or the instruction is executed by the processor 601, the processes of the foregoing PDCCH monitoring processing method embodiment are implemented, and a same technical effect can be achieved. When the communication device 600 is a network side device, and when the program or the instruction is executed by the processor 601, the processes of the foregoing PDCCH monitoring configuration method embodiment are implemented, and a same technical effect can be achieved. To avoid repetition, details are not described herein again.

Figure 7:
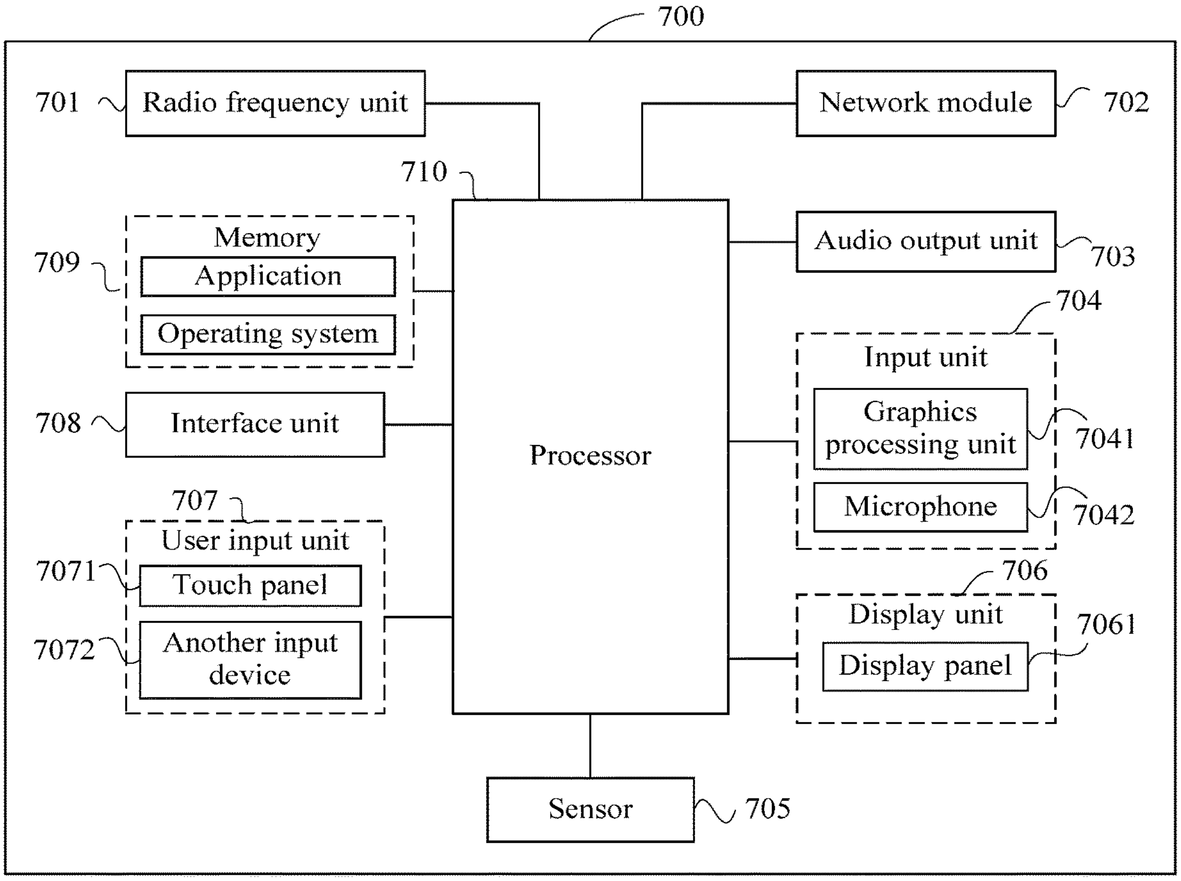
FIG. 7 is a structural diagram of a terminal according to an embodiment of this application.

An embodiment of this application further provides a terminal, including a processor and a communication interface, where the communication interface is configured to receive configuration information, where the configuration information is used to configure a target time domain location of PDCCH monitoring; and the processor is configured to determine whether the target time domain location meets a PDCCH detection capability, where the target time domain location includes at least one first time unit, the PDCCH detection capability includes a blind detection budget restriction or a control channel element CCE budget restriction defined based on at least two second time units, the second time unit includes N first time units, and N is an integer greater than 1. This terminal embodiment corresponds to the foregoing method embodiment on the terminal side. Each implementation process and implementation of the foregoing method embodiment may be applicable to this terminal embodiment, and a same technical effect can be achieved. For example, FIG. 7 is a schematic structural diagram of hardware of a terminal according to the embodiments of this application.

A terminal 700 includes but is not limited to at least a part of components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (such as a battery) that supplies power to each component. The power supply may be logically connected to the processor 710 by using a power supply management system, to implement functions such as charging and discharging management, and power consumption management by using the power supply management system. The terminal structure shown in FIG. 7 constitutes no limitation on the terminal, and the terminal may include more or fewer components than those shown in the figure, or combine some components, or have different component arrangements. Details are not described herein.

It should be understood that, in this embodiment of this application, the input unit 704 may include a graphics processing unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. Optionally, the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 109 may mainly include a program or instruction storage area and a data storage area. The program or instruction storage area may store an operating system, and an application or an instruction required by at least one function (for example, a sound playing function or an image playing function). In addition, the memory 709 may include a high-speed random access memory, and may further include a non-transient memory. The non-transient memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-transient solid-state storage component.

The processor 710 may include one or more processing units. Optionally, an application processor and a modem processor may be integrated into the processor 710. The application processor mainly processes an operating system, a user interface, an application, an instruction, or the like. The modem processor mainly processes wireless communication, for example, a baseband processor. It can be understood that, alternatively, the modem processor may not be integrated into the processor 710.

The radio frequency unit 701 is configured to receive configuration information, where the configuration information is used to configure a target time domain location of PDCCH monitoring.

The processor 710 is configured to determine whether the target time domain location meets a PDCCH detection capability, where the target time domain location includes at least one first time unit, the PDCCH detection capability includes a blind detection budget restriction or a control channel element CCE budget restriction defined based on at least two second time units, the second time unit includes N first time units, and N is an integer greater than 1.

In this embodiment of this application, configuration information is received, where the configuration information is used to configure a target time domain location of PDCCH monitoring; and it is determined whether the target time domain location meets a PDCCH detection capability, where the target time domain location includes at least one first time unit, the PDCCH detection capability includes a blind detection budget restriction or a CCE budget restriction defined based on at least two second time units, the second time unit includes N first time units, and N is an integer greater than 1. Due to the blind detection budget restriction or the control channel element CCE budget restriction defined based on the at least two second time units, when a network side device configures the target time domain location of PDCCH monitoring based on the PDCCH detection capability, a quantity of PDCCH monitoring times can be reduced. Therefore, in this embodiment of this application, power consumption of a terminal operating on a high-frequency band is reduced. In addition, because the quantity of PDCCH monitoring times is reduced, implementation difficulty of the terminal can be reduced.

Optionally, the processor 710 is further configured to determine, according to first target information, a time domain location of a first span based on the first time unit, where the time domain location of the first span is used to determine whether the target time domain location meets the PDCCH detection capability, and the first target information includes the target time domain location.

The first target information further includes a PDCCH monitoring capability parameter reported by the terminal.

Optionally, in a case that the time domain location of the first span is determined in units of one second time unit, the first span meets at least one of the following:

that the first span does not exist within a second time unit having no PDCCH monitoring configuration; or that the time domain location of the first span is determined according to a first preset rule for any second time unit having the PDCCH monitoring configuration, where the first span is repeated on all second time units configured with PDCCH monitoring.

Optionally, the first preset rule includes:

that a maximum length of the first span is Y first time units, and Y is an integer greater than 1;

that a start location of a 1st first span is a start location of a first target time unit on all second time units having the PDCCH monitoring configuration, the first target time unit is a 1st first time unit that is in L1 first time units and that is arranged in ascending order of first location numbers, the first location number is a sorting number of the first time unit within a second time unit in which the first time unit is located, the L1 first time units are all first time units having the PDCCH monitoring configuration, and L1 is a positive integer; and that a start location of an (n+1)-th first span is a start location of a second target time unit on all second time units having the PDCCH monitoring configuration, the second target time unit is a 1st first time unit that is in L2 first time units and that is arranged in ascending order of the first location numbers, the L2 first time units are all first time units that are in the L1 first time units and that are located behind an end location of an n-th first span, and both n and L2 are positive integers.

Optionally, in a case that the time domain location of the first span is determined by using one second time unit as a first time granularity, the time domain location of the first span is determined according to a second preset rule on a first object, where the first object is any time unit with the first time granularity, and the second preset rule includes:

that a maximum length of the first span is Y first time units, and Y is an integer greater than 1;

that a start location of a 1st first span is a start location of a third target time unit on the first object, the third target time unit is a 1st first time unit that is in L3 first time units and that is arranged in ascending order of first location numbers, the first location number is a sorting number of the first time unit within a second time unit in which the first time unit is located, the L3 first time units are all first time units having a PDCCH monitoring configuration on the first object, and L3 is a positive integer; and that a start location of an (n+1)-th first span is a start location of a fourth target time unit on the first object, the fourth target time unit is a 1st first time unit that is in L4 first time units and that is arranged in ascending order of the first location numbers, the L4 first time units are all first time units that are in the L3 first time units and that are located behind an end location of an n-th first span, and both n and L4 are positive integers.

Optionally, in a case that the time domain location of the first span is determined by using M second time units as a second time granularity, the time domain location of the first span is determined according to a second preset rule on a second object, where the second object is any time unit with the second time granularity, and the second preset rule includes:

that a start location of a 1st first span is a start location of a fifth target time unit on all second time units having a PDCCH monitoring configuration, the fifth target time unit is a 1st first time unit that is in L5 first time units and that is arranged in ascending order of second location numbers, the second location number is a sorting number of the first time unit within a second time unit in which the first time unit is located, the L5 first time units are all first time units having the PDCCH monitoring configuration, and L5 is a positive integer; and that a start location of an (n+1)-th first span is a start location of a sixth target time unit on all second time units having the PDCCH monitoring configuration, the sixth target time unit is a 1st first time unit that is in L6 first time units and that is arranged in ascending order of the second location numbers, the L6 first time units are all first time units that are in the L5 first time units and that are located behind an end location of an n-th first span, and both n and L6 are positive integers.

Optionally, the time domain location of the first span is repeated in every M second time units.

Optionally, the PDCCH detection capability includes: that an interval between 1st first time units of any two consecutive first spans is greater than or equal to first preset duration.

Optionally, the first span meets at least one of the following:

that the time domain location of the first span is located within one second time unit; or that each first time unit within the first span has a PDCCH monitoring configuration.

Optionally, the PDCCH detection capability includes at least one of the following:

that a first time unit having a PDCCH monitoring configuration is located at a first preset location of a second time unit in which the first time unit is located; or that a second time unit having the PDCCH monitoring configuration is located at a second preset location in every J second time units, and J is an integer greater than 1.

Optionally, the second preset location includes any one of the following: the first K second time units, where K is a positive integer less than or equal to J; the last K second time units; any consecutive K second time units; and any K second time units.

Optionally, the processor 710 is further configured to determine, according to second target information, a time domain location of a second span based on the second time unit, where the time domain location of the second span is used to determine whether the target time domain location meets the PDCCH detection capability, and the second target information includes the target time domain location.

Optionally, the second target information further includes the PDCCH monitoring capability parameter reported by the terminal.

Optionally, the PDCCH detection capability includes: that an interval between 1st second time units of any two consecutive second spans is greater than or equal to second preset duration.

Figure 8:
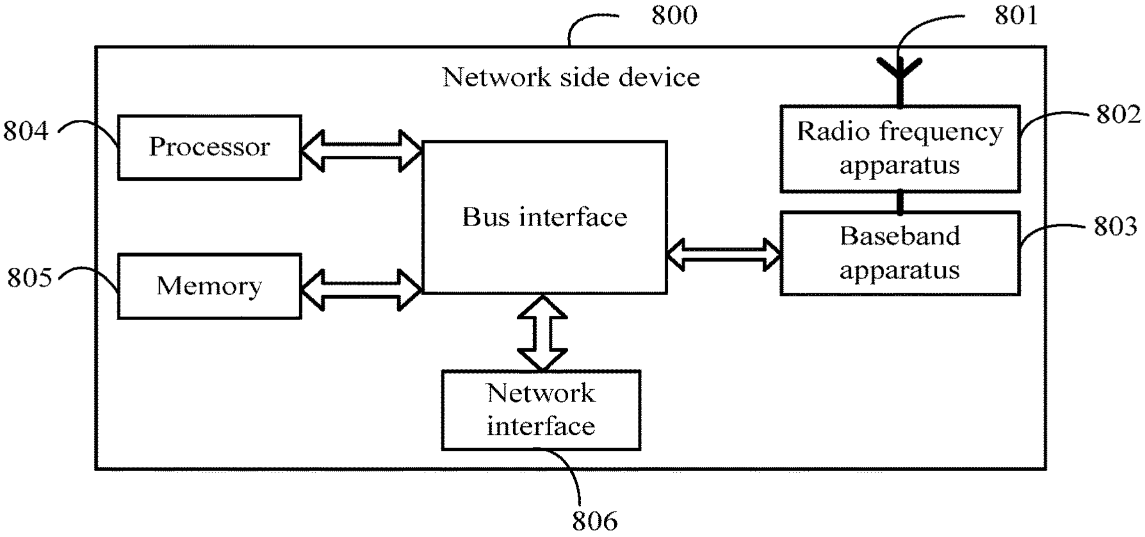
FIG. 8 is a structural diagram of a network side device according to an embodiment of this application.

For example, an embodiment of this application further provides a network side device. As shown in FIG. 8, a network side device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes information that needs to be sent, and sends processed information to the radio frequency apparatus 802. The radio frequency apparatus 802 processes the received information, and sends processed information by using the antenna 801.

The frequency band processing apparatus may be located in the baseband apparatus 803. The method performed by the network side device in the foregoing embodiment may be implemented in the baseband apparatus 803. The baseband apparatus 803 includes a processor 804 and a memory 805.

The baseband apparatus 803 may include, for example, at least one baseband board, where a plurality of chips are disposed on the baseband board. As shown in FIG. 8, one chip is, for example, the processor 804, which is connected to the memory 805, so as to invoke a program in the memory 805 to perform operations of the network side device shown in the foregoing method embodiment.

The baseband apparatus 803 may further include a network interface 806, configured to exchange information with the radio frequency apparatus 802. For example, the interface is a common public radio interface (CPRI).

For example, the network side device in this embodiment of this application further includes an instruction or a program stored in the memory 805 and executable on the processor 804. The processor 804 invokes the instruction or the program in the memory 805 to perform the method performed by the modules shown in FIG. 5, and a same technical effect is achieved. To avoid repetition, details are not described herein again.

An embodiment of this application further provides a non-transitory computer-readable storage medium. The non-transitory computer-readable storage medium stores a program or an instruction, and the program or the instruction is executed by a processor to implement the processes of the foregoing PDCCH monitoring processing method or PDCCH monitoring configuration method embodiment and a same technical effect can be achieved. To avoid repetition, details are not described herein again.

The processor is a processor in the electronic device in the foregoing embodiment. The non-transitory computer-readable storage medium includes a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to execute a program or an instruction to implement the processes of the foregoing PDCCH monitoring processing method or PDCCH monitoring configuration method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a program product. The program product is stored in a non-transient storage medium, and the program product is executed by at least one processor to implement the processes of the foregoing PDCCH monitoring processing method or PDCCH monitoring configuration method embodiment, and a same technical effect can be achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air conditioner, a base station, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A physical downlink control channel (PDCCH) monitoring processing method, comprising:

receiving, by a terminal, configuration information, wherein the configuration information is used to configure a target time domain location of PDCCH monitoring; and determining, by the terminal, whether the target time domain location meets a PDCCH detection capability, wherein the target time domain location comprises at least one first time unit, the PDCCH detection capability comprises a blind detection (BD) budget restriction or a control channel element (CCE) budget restriction defined based on at least two second time units, a second time unit comprises N first time units, and N is an integer greater than 1; wherein a first time unit is a symbol, and the second time unit has a time granularity equal to or greater than one slot;

wherein before the determining, by the terminal, whether the target time domain location meets a PDCCH detection capability, the method further comprises:

determining, by the terminal according to first target information, a time domain location of a first span based on the first time unit, wherein the time domain location of the first span is used to determine whether the target time domain location meets the PDCCH detection capability, and the first target information comprises the target time domain location;

wherein in a case that the time domain location of the first span is determined by using one second time unit as a first time granularity, the time domain location of the first span is determined according to a second preset rule on a first object, wherein the first object is any time unit with the first time granularity, and the second preset rule comprises:

that a maximum length of the first span is Y first time units, and Y is an integer greater than 1;

that a start location of a 1st first span is a start location of a third target time unit on the first object, the third target time unit is a 1st first time unit that is in L3 first time units and that is arranged in ascending order of first location numbers, the first location number is a sorting number of the first time unit within a second time unit in which the first time unit is located, the L3 first time units are all first time units having a PDCCH monitoring configuration on the first object, and L3 is a positive integer; and that a start location of an (n+1)-th first span is a start location of a fourth target time unit on the first object, the fourth target time unit is a 1st first time unit that is in L4 first time units and that is arranged in ascending order of the first location numbers, the L4 first time units are all first time units that are in the L3 first time units and that are located behind an end location of an n-th first span, and both n and L4 are positive integers.

2. The method according to claim 1, wherein the PDCCH detection capability comprises: that an interval between 1st first time units of any two consecutive first spans is greater than or equal to first preset duration.

3. The method according to claim 1, wherein the first span meets at least one of the following:

that the time domain location of the first span is located within one second time unit; or that each first time unit within the first span has the PDCCH monitoring configuration.

4. The method according to claim 1, wherein the PDCCH detection capability comprises at least one of the following:

that a first time unit having the PDCCH monitoring configuration is located at a first preset location of a second time unit in which the first time unit is located; or that a second time unit having the PDCCH monitoring configuration is located at a second preset location in every J second time units, and J is an integer greater than 1;

wherein the second preset location comprises any one of the following: the first K second time units, wherein K is a positive integer less than or equal to J; the last K second time units; any consecutive K second time units; and any K second time units.

5. A physical downlink control channel (PDCCH) monitoring configuration method, comprising:

obtaining, by a network side device, a PDCCH detection capability;

determining, by the network side device, configuration information according to the PDCCH detection capability, wherein the configuration information is used to configure a target time domain location of PDCCH monitoring; and sending, by the network side device, the configuration information to a terminal, wherein the target time domain location comprises at least one first time unit, the target time domain location meets the PDCCH detection capability, the PDCCH detection capability comprises a blind detection (BD) budget restriction or a control channel element (CCE) budget restriction defined based on at least two second time units, a second time unit comprises N first time units, and N is an integer greater than 1, wherein a first time unit is a symbol, and the second time unit has a time granularity equal to or greater than one slot;

wherein that the target time domain location meets the PDCCH detection capability comprises:

that a first span based on the first time unit meets the PDCCH detection capability, wherein the first span is determined based on first target information, and the first target information comprises the target time domain location;

wherein in a case that the time domain location of the first span is determined by using one second time unit as a first time granularity, the time domain location of the first span is determined according to a second preset rule on a first object, wherein the first object is any time unit with the first time granularity, and the second preset rule comprises:

that a maximum length of the first span is Y first time units, and Y is an integer greater than 1;

that a start location of a 1st first span is a start location of a third target time unit on the first object, the third target time unit is a 1st first time unit that is in L3 first time units and that is arranged in ascending order of first location numbers, the first location number is a sorting number of the first time unit within a second time unit in which the first time unit is located, the L3 first time units are all first time units having a PDCCH monitoring configuration on the first object, and L3 is a positive integer; and that a start location of an (n+1)-th first span is a start location of a fourth target time unit on the first object, the fourth target time unit is a 1st first time unit that is in L4 first time units and that is arranged in ascending order of the first location numbers, the L4 first time units are all first time units that are in the L3 first time units and that are located behind an end location of an n-th first span, and both n and L4 are positive integers.

6. The method according to claim 5, wherein the first target information further comprises a PDCCH monitoring capability parameter reported by the terminal.

7. The method according to claim 5, wherein the PDCCH detection capability comprises: that an interval between 1st first time units of any two consecutive first spans is greater than or equal to first preset duration.

8. The method according to claim 5, wherein the first span meets at least one of the following:

that the time domain location of the first span is located within one second time unit; or that each first time unit within the first span has the PDCCH monitoring configuration.

9. The method according to claim 5, wherein the PDCCH detection capability comprises at least one of the following:

that a first time unit having the PDCCH monitoring configuration is located at a first preset location of a second time unit in which the first time unit is located; or that a second time unit having the PDCCH monitoring configuration is located at a second preset location in every J second time units, and J is an integer greater than 1;

wherein the second preset location comprises any one of the following: the first K second time units, wherein K is a positive integer less than or equal to J; the last K second time units; any consecutive K second time units; and any K second time units.

10. A terminal, comprising a memory, a processor, and a program stored in the memory and executable on the processor, wherein the program, when executed by the processor, causes the terminal to perform:

receiving configuration information, wherein the configuration information is used to configure a target time domain location of physical downlink control channel (PDCCH) monitoring; and determining whether the target time domain location meets a PDCCH detection capability, wherein the target time domain location comprises at least one first time unit, the PDCCH detection capability comprises a blind detection (BD) budget restriction or a control channel element (CCE) budget restriction defined based on at least two second time units, a second time unit comprises N first time units, and N is an integer greater than 1, wherein a first time unit is a symbol, and the second time unit has a time granularity equal to or greater than one slot;

wherein the program, when executed by the processor, causes the terminal to further perform:

determining, according to first target information, a time domain location of a first span based on the first time unit, wherein the time domain location of the first span is used to determine whether the target time domain location meets the PDCCH detection capability, and the first target information comprises the target time domain location;

wherein in a case that the time domain location of the first span is determined by using one second time unit as a first time granularity, the time domain location of the first span is determined according to a second preset rule on a first object, wherein the first object is any time unit with the first time granularity, and the second preset rule comprises:

that a maximum length of the first span is Y first time units, and Y is an integer greater than 1;

that a start location of a 1st first span is a start location of a third target time unit on the first object, the third target time unit is a 1st first time unit that is in L3 first time units and that is arranged in ascending order of first location numbers, the first location number is a sorting number of the first time unit within a second time unit in which the first time unit is located, the L3 first time units are all first time units having a PDCCH monitoring configuration on the first object, and L3 is a positive integer; and that a start location of an (n+1)-th first span is a start location of a fourth target time unit on the first object, the fourth target time unit is a 1st first time unit that is in L4 first time units and that is arranged in ascending order of the first location numbers, the L4 first time units are all first time units that are in the L3 first time units and that are located behind an end location of an n-th first span, and both n and L4 are positive integers.

11. The terminal according to claim 10, wherein the PDCCH detection capability comprises: that an interval between 1st first time units of any two consecutive first spans is greater than or equal to first preset duration.

12. The terminal according to claim 10, wherein the first span meets at least one of the following:

that the time domain location of the first span is located within one second time unit; or that each first time unit within the first span has the PDCCH monitoring configuration.

13. A network side device, comprising a memory, a processor, and a program or an instruction stored in the memory and executable on the processor, wherein when the program or the instruction is executed by the processor, steps of the PDCCH monitoring configuration method according to claim 5 are implemented.

14. The terminal according to claim 10, wherein the PDCCH detection capability comprises at least one of the following:

that a first time unit having the PDCCH monitoring configuration is located at a first preset location of a second time unit in which the first time unit is located; or that a second time unit having the PDCCH monitoring configuration is located at a second preset location in every J second time units, and J is an integer greater than 1;

wherein the second preset location comprises any one of the following: the first K second time units, wherein K is a positive integer less than or equal to J; the last K second time units; any consecutive K second time units; and any K second time units.

* * * * *